(12) United States Patent
Sasaki et al.

(10) Patent No.: US 8,054,542 B2
(45) Date of Patent: Nov. 8, 2011

(54) SCANNING LASER MICROSCOPE

(75) Inventors: Hiroshi Sasaki, Tokyo (JP); Yasunari Matsukawa, Saitama (JP)

(73) Assignee: Olympus Corporation, Tokyo (JP)

( * ) Notice: Subject to any disclaimer, the term of this patent is extended or adjusted under 35 U.S.C. 154(b) by 306 days.

(21) Appl. No.: 12/251,602

(22) Filed: Oct. 15, 2008

(65) Prior Publication Data
US 2009/0109527 A1 Apr. 30, 2009

(30) Foreign Application Priority Data
Oct. 24, 2007 (JP) ................................ 2007-276079

(51) Int. Cl.
*G02B 21/00* (2006.01)
(52) U.S. Cl. .................... 359/368; 359/372; 359/385
(58) Field of Classification Search ........... 359/368–390
See application file for complete search history.

(56) References Cited

U.S. PATENT DOCUMENTS

| 4,827,125 | A | * | 5/1989 | Goldstein ................... 250/234 |
| 5,255,257 | A | | 10/1993 | Bryant et al. |
| 5,355,252 | A | * | 10/1994 | Haraguchi ................... 359/369 |
| 5,936,764 | A | * | 8/1999 | Kobayashi ................... 359/385 |
| 6,028,306 | A | | 2/2000 | Hayashi |
| 7,239,384 | B2 | * | 7/2007 | Kawano ...................... 356/317 |
| 7,339,148 | B2 | * | 3/2008 | Kawano et al. ............. 250/201.3 |
| 2002/0141051 | A1 | | 10/2002 | Vogt et al. |

FOREIGN PATENT DOCUMENTS

| JP | 05-060980 A | 3/1993 |
| JP | 10-311950 A | 11/1998 |
| WO | WO 02/101888 A2 | 12/2002 |

OTHER PUBLICATIONS

European Search Report dated Feb. 9, 2009, 9 pages, issued in counterpart European Application No. EP 08017965.8-2217.
Seung Woo Lee et al., "Design and Performance Evaluation of Reflection Confocal Microscopy using Acousto-Optical Deflector and Slit detector", Proc. of SPIE, vol. 5324, 2004, pp. 235-241, XP002511981.

* cited by examiner

*Primary Examiner* — Thong Nguyen
(74) *Attorney, Agent, or Firm* — Holtz, Holtz, Goodman & Chick, P.C.

(57) ABSTRACT

A scanning laser microscope includes a laser light source; an acousto-optic deflector having a crystal, being arranged in an optical path of a laser beam emitted from the laser light source and capable of changing a traveling direction of the laser beam when frequencies of acoustic waves applied to the crystal are changed; a frequency control unit configured to simultaneously apply acoustic waves having a plurality of frequencies to the crystal of the acousto-optic deflector; an objective lens configured to converge the laser beam emitted from the laser light source to form a beam spot on a specimen; and an optical scanning device configured to two-dimensionally scan the scanning spot by deflecting the laser beam in two directions perpendicular to each other. The acousto-optic deflector, the optical scanning device, and a pupil of the objective lens are arranged at positions optically conjugate with each other.

38 Claims, 15 Drawing Sheets

FIG. 13B

| | C) ONE AREA OBSERVATION, ONE SPOT MACRO STIMULUS (DIFFERENT WAVELENGTHS FOR STIMULUS AND OBSERVATION) | D) ONE SPOT MACRO OBSERVATION, ONE SPOT MACRO STIMULUS + ONE SPOT MICRO STIMULUS |
|---|---|---|
| SCANNING PATTERN AT PRIMARY IMAGE POSITION | OBSERVATION AREA (488nm), MACRO STIMULUS (405nm). SCANNING BY GALVANOMETER MIRROR IS CANCELED BY ACOUSTO-OPTIC DEFLECTOR | MACRO OBSERVATION (488nm), MICRO STIMULUS (405nm), MACRO STIMULUS (405nm). MICRO STIMULUS AND MACRO STIMULUS ARE RAPIDLY SWITCHED TO EACH OTHER DURING MACRO OBSERVATION |
| POSITION OF ON STATE MICRO-MIRRORS ON DMD | (X direction, Y direction: single point) | (X direction, Y direction: small square cluster) |
| EFFECTIVE PIXELS ON TWO-DIMENSIONAL PHOTODETECTOR | (X direction, Y direction: single point) | (X direction, Y direction: small square cluster) |

SCANNING LASER MICROSCOPE

BACKGROUND OF THE INVENTION

1. Field of the Invention

The present invention relates to scanning laser microscopes.

This application is based on Japanese Patent Application No. 2007-276079, the content of which is incorporated herein by reference.

2. Description of Related Art

Known scanning laser microscopes in the related art include those using a multipoint scanning method for reducing the image acquisition time (see Japanese Unexamined Patent Applications, Publication Nos. Hei 5-60980 and Hei 10-311950).

The scanning laser microscope disclosed in Japanese Unexamined Patent Application, Publication No. Hei 5-60980 uses a Nipkow disk and a microlens array. The scanning laser microscope disclosed in Japanese Unexamined Patent Application, Publication No. Hei 10-311950 uses a microlens array or a laser diode array to form multiple beam spots, and the beam spots are scanned by two deflectors, such as galvanometer mirrors.

In the scanning laser microscopes disclosed in Japanese Unexamined Patent Applications, Publication Nos. Hei 5-60980 and Hei 10-311950, by scanning multiple scanning spots over a specimen simultaneously, it is possible to scan a certain area of the specimen within a short time compared to scanning with a single scanning spot.

BRIEF SUMMARY OF THE INVENTION

An aspect of the present invention is a scanning laser microscope including a laser light source; an acousto-optic deflector having a crystal and being arranged in an optical path of a laser beam emitted from the laser light source, the acousto-optic deflector being capable of changing a traveling direction of the laser beam when the frequencies of acoustic waves applied to the crystal, are changed; a frequency control unit configured to simultaneously apply acoustic waves having a plurality of frequencies to the crystal of the acousto-optic deflector; an objective lens configured to converge the laser beam emitted from the laser light source to form a beam spot on a specimen; and an optical scanning device configured to two-dimensionally scan a scanning spot consisting of the beam spot on the specimen by deflecting the laser beam from the laser light source in two directions perpendicular to each other. The acousto-optic deflector, the optical scanning device, and a pupil of the objective lens are arranged at positions optically conjugate with each other.

According to the aspect of the present invention, the laser beam emitted from the laser light source is deflected when it passes through the acousto-optic deflector. Because the frequency control unit simultaneously applies acoustic waves having a plurality of frequencies to the crystal of the acousto-optic deflector, the laser beam emitted from the acousto-optic deflector is deflected in a plurality of directions at the changed angles according to the frequencies and is divided into a plurality of laser beams. The divided laser beams are converged by the objective lens to form beam spots on the specimen and are two-dimensionally scanned over a predetermined area of the specimen by the optical scanning device. Thus, it is possible to excite a fluorescent substance in the specimen or apply light stimulus to a specific area of the specimen. At this time, by adjusting the frequencies of acoustic waves applied to the crystal by the frequency control unit, the number, position, or spacing of the scanning spots that are simultaneously scanned can be flexibly and freely changed with no loss of light.

According to the aspect of the present invention, the acousto-optic deflector, the optical scanning device, and the pupil of the objective lens are arranged at positions optically conjugate with each other. Accordingly, all the laser beams divided by the acousto-optic deflector can be made to pass through the center of the pupil of the objective lens, enabling observation with high resolution.

The scanning laser microscope according to the above-described aspect may further include a beam splitter configured to separate the laser beam and returning light from the specimen, and a photodetector configured to detect the returning light from the specimen after being separated by the beam splitter. The beam splitter may be arranged in an optical path between the acousto-optic deflector and the objective lens.

The scanning laser microscope according to the above-described configuration may further include confocal pinhole. The acousto-optic deflector divides the laser beam into a plurality of laser beams and deflects them in different directions. The deflection directions may be aligned with a sub-scanning direction of the two directions perpendicular to each other in which the optical scanning device scans the scanning spot. A plurality of the confocal pinholes may be provided in an optical path of the returning light from the specimen after being separated by the beam splitter. The confocal pinholes may be configured to allow the returning light from a plurality of the scanning spots on the specimen to pass therethrough. A plurality of the photodetectors may be provided, so that each of the photodetectors can detect the returning light emitted from a corresponding scanning spot and passed through a corresponding confocal pinhole.

The scanning laser microscope having a plurality of photodetectors, as described above, may further include an image processing unit configured to form a single image by combining images acquired by the photodetectors.

In the scanning laser microscope having any one of the above-described structures, the frequency control unit may adjust the frequencies of acoustic waves applied to the crystal of the acousto-optic deflector in accordance with a change in a scanning area to be scanned by the optical scanning device.

In the scanning laser microscope having the confocal pinholes, as described above, the confocal pinholes may be a micro-element array that includes a plurality of micro-elements arranged in a matrix and activates the micro-elements within an area having an imaging relationship with the plurality of scanning spots.

In the scanning laser microscope having the photodetector, as described above, the photodetector may be a one-dimensional photodetector or a two-dimensional photodetector. The photodetector may be configured to detect the returning light from the scanning spots with pixels having an imaging relationship with the plurality of scanning spots.

In the scanning laser microscope having the photodetector, as described above, the photodetector may be a two-dimensional photodetector. The confocal pinholes may be formed by activating a plurality of pixels having an imaging relationship with the plurality of scanning spots, corresponding to each of the scanning spots.

In the scanning laser microscope, the area of the micro-elements to be activated to be used as the confocal pinholes may be determined corresponding to the frequencies and the number of frequencies of a plurality of acoustic waves applied to the crystal of the acousto-optic deflector.

Furthermore, in the scanning laser microscope, the pixels of the photodetector to be used for detection may be determined corresponding to the frequencies and the number of frequencies of a plurality of acoustic waves applied to the crystal of the acousto-optic deflector.

In the scanning laser microscope having the photodetector that detects the returning light from each of the scanning spots with the pixels having an imaging relationship with the plurality of scanning spots, as described above, the frequency control unit may adjust the frequencies of acoustic waves applied to the crystal of the acousto-optic deflector such that the spacing of the scanning spots formed in the sub-scanning direction is equal to the spacing of a pixel row of the one-dimensional photodetector or the spacing of a pixel row of the two-dimensional photodetector aligned in the sub-scanning direction to allow the specimen to be irradiated with substantially linear light. The photodetector may simultaneously detect linear returning light from the plurality of scanning spots on the specimen.

The scanning laser microscope having a plurality of photodetectors, as described above, may further include a magnification-varying lens arranged between the beam splitter and the confocal pinholes. The magnification of the magnification-varying lens may be variably controlled in accordance with the image acquisition area.

In the scanning laser microscope according to the above aspect, the acousto-optic deflector may divide the light beam both in the main scanning direction and the sub-scanning direction of the optical scanning device.

In the scanning laser microscope having the above-described structure, the acousto-optic deflector may include a first acousto-optic deflector configured to deflect the laser beam in the sub-scanning direction and a second acousto-optic deflector configured to deflect the laser beam in the main scanning direction so that a plurality of scanning spots can be formed in a matrix on the specimen.

In the scanning laser microscope in which a plurality of scanning spots are formed in a matrix on the specimen, the frequency control unit may apply acoustic waves having a plurality of frequencies to each of the first and second acousto-optic deflectors to divide the laser beam into a plurality of laser beams and form beam spots on the specimen. A macro spot may be formed by arranging the beam spots in an adjacent or partially overlapping mariner. The number and/or interval of the frequencies of acoustic waves applied to the acousto-optic deflector may be adjusted such that the size of the macro spot is changed.

The scanning laser microscope having the above-described structure may further include a beam-diameter-varying optical system configured to vary the diameter of the laser beam incident on the pupil of the objective lens. The beam-diameter-varying optical system may be arranged between the laser light source and the acousto-optic deflector.

The scanning laser microscope in which a plurality of scanning spots are formed in a matrix on the specimen may further include a beam splitter configured to separate the laser beam and returning light from the specimen, the beam splitter being arranged in an optical path between the objective lens and the first and second acousto-optic deflectors; and a photodetector configured to detect the returning light from the specimen after being separated by the beam splitter.

In the scanning laser microscope having the above-described structure, the laser light source may emit a stimulus laser beam and an observation laser beam having different wavelengths. The frequency control unit may simultaneously apply acoustic waves having frequencies corresponding to the wavelengths of the laser beams to the acousto-optic deflector to form the scanning spots of the laser beams at different positions on the specimen. The photodetector may detect the returning light from the scanning spot of the observation laser beam.

In the scanning laser microscope having the photodetector that detects the returning light from the scanning spots of the observation laser beam, the frequency control unit may change the frequencies of acoustic waves applied to the acousto-optic deflector so as to switch between an irradiation position of the stimulus laser beam and an irradiation position of the observation laser beam.

In addition, the frequency control unit may, independently of the scanning by the optical scanning device, scan the frequencies of acoustic waves applied to the acousto-optic deflector so that the irradiation position of the stimulus laser beam is fixed.

In the scanning laser microscope having the above-described structure, the frequency control unit may adjust the frequencies of acoustic waves applied to the acousto-optic deflector such that the spacing of the plurality of beam spots, both in the X and Y directions, arranged in a matrix on the specimen is uniform. With the beam spots, the optical scanning device may scan scanning areas in the main scanning direction and the sub-scanning direction corresponding to the spacing of the beam spots. Confocal pinholes may be arranged at imaging positions of the beam spots.

The scanning laser microscope having the above-described structure may further include a display unit configured to display an image formed by combining images acquired by the photodetectors.

In the scanning laser microscope having the display unit, as described above, the laser light source may be a near-infrared pulse laser light source for multiphoton excitation observation.

BRIEF DESCRIPTION OF THE SEVERAL
VIEWS OF THE DRAWINGS

FIG. 13B is a table showing the scanning pattern of beam spots by the scanning laser microscope shown in FIG. 12, the position of ON state micro-mirrors of the DMD, and the position of effective pixels of the CCD, for various scanning methods.

DETAILED DESCRIPTION OF THE INVENTION

A scanning laser microscope 1 according to a first embodiment of the present invention will be described below with reference to the drawings.

Figure 1:
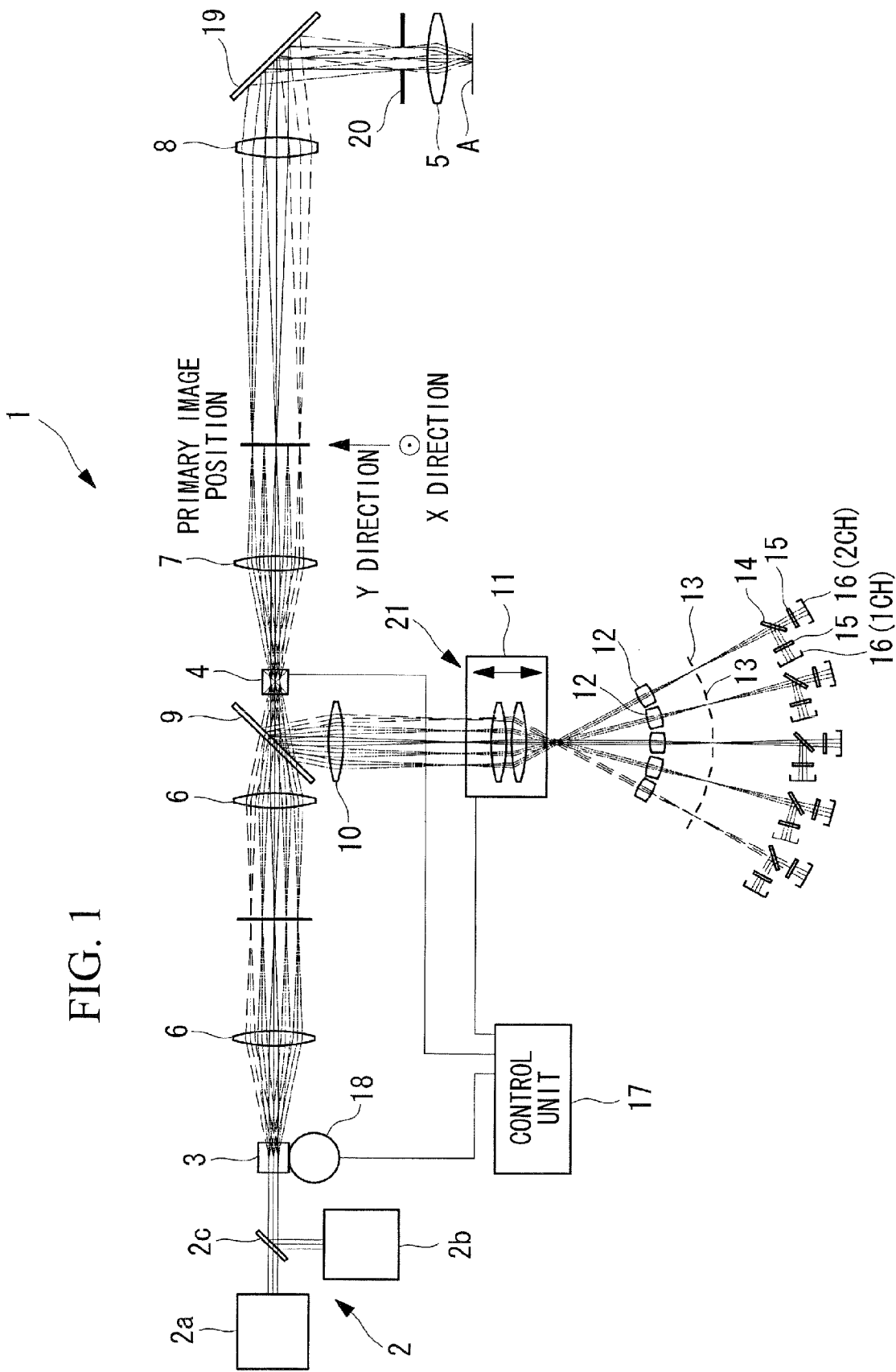
FIG. 1 shows the overall configuration of a scanning laser microscope according to a first embodiment of the present invention.

Referring to FIG. 1, the scanning laser microscope 1 according to the present embodiment includes a laser light source 2 for emitting a laser beam, an acousto-optic deflector 3 for deflecting the laser beam from the laser light source 2, a so-called proximity galvanometer mirror scanner (optical scanning device) 4 for two-dimensionally scanning the laser beam deflected by the acousto-optic deflector 3, and an objective lens 5 for converging the laser beam two-dimensionally scanned by the proximity galvanometer mirror 4 onto a specimen A.

Two projection lenses 6 are arranged between the acousto-optic deflector 3 and the proximity galvanometer mirror 4. A pupil-projection lens 7 and an imaging lens 8 are arranged between the proximity galvanometer mirror 4 and the objective lens 5. An excitation dichroic mirror (beam splitter) 9 for separating the fluorescence returning from the specimen A from the laser beam is arranged in an optical path between the proximity galvanometer mirror 4 and the projection lenses 6. A converging lens 10, a magnification-varying lens 11, confocal lenses 12, confocal pinholes 13, light-splitting dichroic mirrors 14, barrier filters 15, and photodetectors (photomultiplier tubes) 16 are arranged in optical paths of the fluorescence rays separated by the excitation dichroic mirror 9.

The acousto-optic deflector 3, the proximity galvanometer mirror 4, and the magnification-varying lens 11 are connected to a control unit (frequency control unit) 17. The control unit 17 adjusts the frequency of the acoustic wave applied to the crystal of the acousto-optic deflector 3. The control unit 17 also adjusts the scanning area over which the laser beam is scanned by the proximity galvanometer mirror 47 the scanning speed, and the scanning direction. The control unit 17 also adjusts the magnification varied by the magnification-varying lens 11.

The laser light source 2 includes an argon (Ar) laser light source 2a (488 nm) and a diode-pumped solid-state (DPSS) laser light source 2b (560 nm). A combining dichroic mirror 2c combines the optical paths of the laser beams emitted from the laser light sources 2a and 2b.

In the drawings, reference numeral 18 is a frequency generator (frequency control unit), reference numeral 19 is a mirror, and reference numeral 20 is a pupil of the objective lens 5.

The acousto-optic deflector 3, the proximity galvanometer mirror 4, and the pupil 20 of the objective lens 5 are arranged at positions optically conjugate with each other. The acousto-optic deflector 3 is optically conjugated with the proximity galvanometer mirror 4 by the projection lenses 6. The proximity galvanometer mirror 4 is optically conjugated with the pupil 20 of the objective lens 5 by the pupil-projection lens 7 and the imaging lens 8. The proximity galvanometer mirror 4 includes a first mirror for deflecting a laser beam in the X direction, and a second mirror for deflecting a laser beam in the Y direction perpendicular to the X direction. The first and second mirrors are arranged as close as possible to each other, with no relay optical system provided therebetween. The pupil 20 of the objective lens 5 and substantially the midpoint between the first and second mirrors constituting the proximity galvanometer mirror 4 are arranged at positions optically conjugate with each other.

Figure 2:
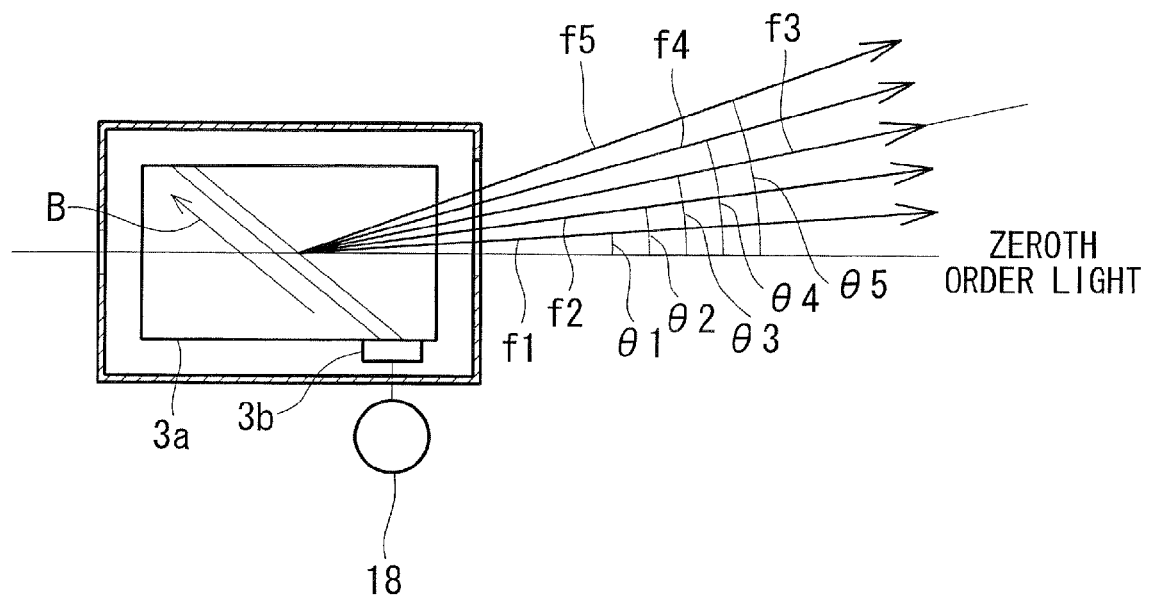
FIG. 2 shows the structure and operation of an acousto-optic deflector used in the scanning laser microscope shown in FIG. 1.

Referring to FIG. 2, the acousto-optic deflector 3 includes a crystal 3a on which a laser beam is incident, and a transducer 3b for generating high-frequency acoustic waves to be applied to the crystal 3a. The arrow B indicates the direction in which the high-frequency acoustic waves propagate. By changing the frequency of the high-frequency acoustic wave applied to the crystal 3a, the deflection angle of the laser beam is changed. By simultaneously applying high-frequency acoustic waves of a plurality of frequencies to the crystal 3a, a laser beam incident on the crystal 3a is divided into a plurality of laser beams, in the direction parallel to the plane of the drawing (Y direction).

In the example shown in FIGS. 1 and 2, the acousto-optic deflector 3 is subjected to high-frequency acoustic waves of five different frequencies, and thus divides a laser beam into five laser beams.

The deflection direction of the acousto-optic deflector 3 is aligned with the sub-scanning direction of the proximity galvanometer mirror 4. The Train scanning direction of the proximity galvanometer mirror 4 is the direction perpendicular to the plane of the drawing.

The relationship between the deflection angle θ, and the frequency f, of an acoustic wave applied to the crystal 3a of the acousto-optic deflector 3 is given by the following expression:

$$\theta = \lambda \times f / Va,$$

where Va is the acoustic velocity in the crystal 3a.

Accordingly, when high-frequency acoustic waves having different frequencies f1, f2, f3, f4, and f5 are simultaneously applied to the crystal 3a, a laser beam is separated into beams oriented in a plurality of directions having deflection angles of θ1, θ2, θ3, θ4, and θ5, respectively, as shown in FIG. 2. (Although the center rays of the laser beams entering and exiting the acousto-optic deflector 3 are parallel to each other in FIG. 1, they are actually slightly deflected, as shown in FIG. 2. Thus, FIG. 1 is illustrated such that the central optical axis agrees with the direction having a deflection angle of θ3, corresponding to the frequency f3, shown in FIG. 2.)

Figure 3:
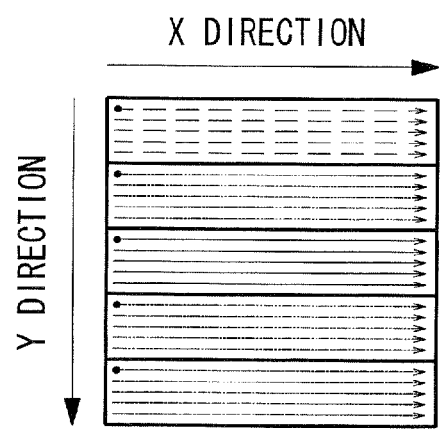
FIG. 3 shows movement of beam spots scanned over a specimen by the scanning laser microscope shown in FIG. 1.

The laser beam thus divided into the beams oriented in five directions passes through the objective lens 5 and forms scanning spots, consisting of five beam spots, on the specimen A. As shown in FIG. 3, the beam spots are scanned by the proximity galvanometer mirror 4 in the main scanning direction (X direction) and the sub-scanning direction (Y direction). The scanning area is divided into five sections in the sub-scanning direction (Y direction). Therefore, when the same area is scanned, the scanning laser microscope 1 acquires an image five times faster than a scanning laser microscope using a single scanning spot.

The fluorescence emitted from the five scanning spots on the specimen A is directed to detection optical paths 21 by the excitation dichroic mirror 9. The fluorescence is divided into a plurality of rays oriented in different directions by the converging lens 10 and, the magnification-varying lens 11. The rays pass through the confocal lenses 12, the confocal pinholes 13, the light-splitting dichroic mirrors 14, and the barrier filters 15, which are arranged in their optical paths, and are simultaneously detected by the photodetectors 16. (Because the detection light beams are descanned by the proximity galvanometer mirror 4, the directions and positions of the detection light beams do not change even though they are scanned by the proximity galvanometer mirror 4.)

Figure 7:
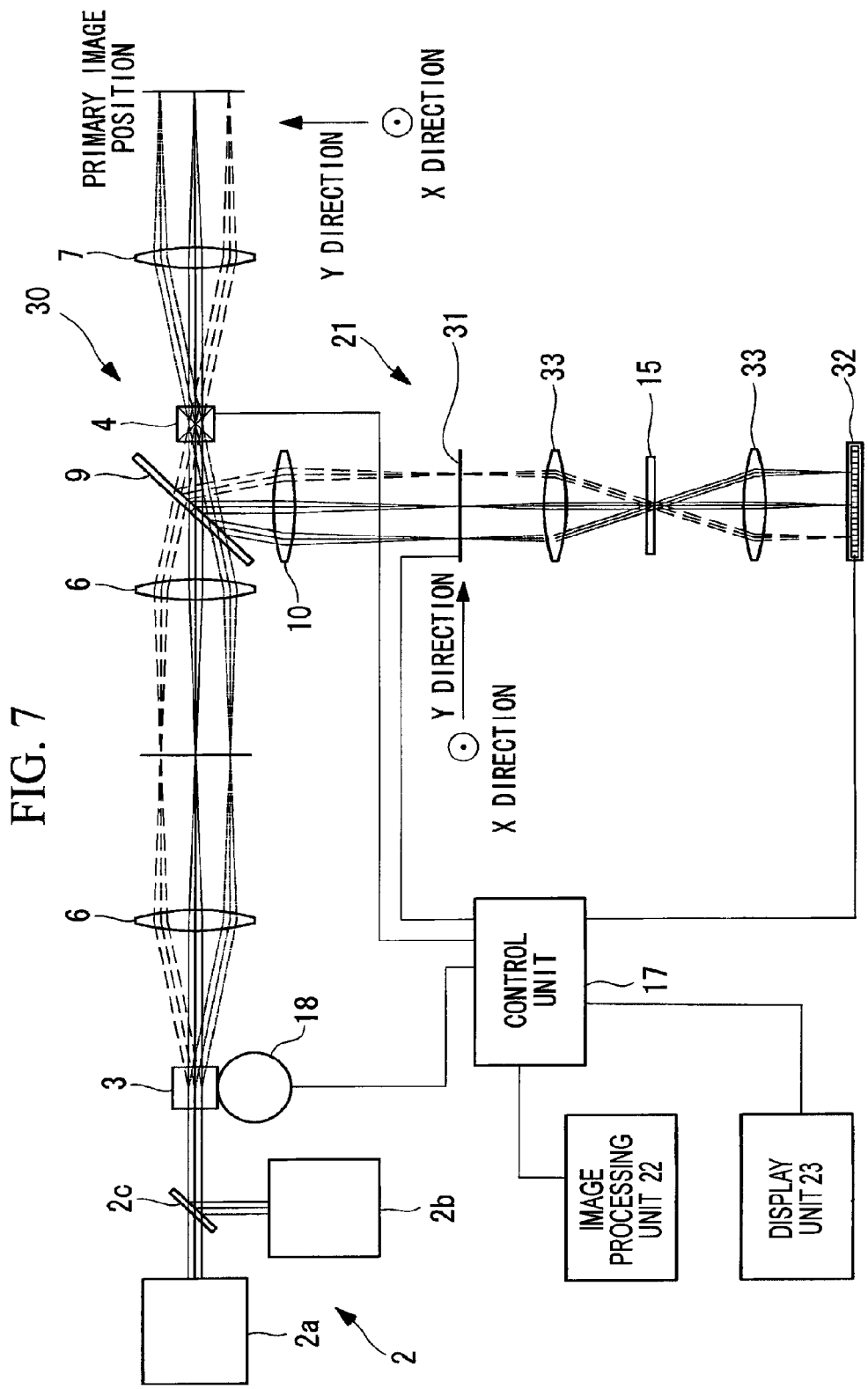
FIG. 7 shows the overall configuration of a scanning laser microscope according to a second embodiment of the present invention.

Ten of these photodetectors 16 are connected to an image processing unit and a display unit (see the image processing unit 22 and the display unit 23 in FIG. 7). The image processing unit combines the images acquired by the photodetectors 16 into a single image, and the display unit displays the combined image.

In the above-described scanning laser microscope 1 according to the present embodiment, a laser beam emitted from the laser light source 2 is separated into a plurality of laser beams to simultaneously illuminate the specimen A. The number, position, and the spacing of the laser beams can be changed according to the frequencies of acoustic waves applied to the acousto-optic deflector 3. Thus, the specimen A is simultaneously excited by a plurality of scanning spots, whereby the image acquisition time can be reduced.

In the scanning laser microscope 1 according to the present embodiment, in the case of using a specimen A that does not require reduced image acquisition time but requires strong laser power for light stimulus etc., the control unit 17 applies only an acoustic wave with a frequency of f3 to the acousto-optic deflector 3, to form only one scanning spot. In this case, among the five detection optical paths 21, only the central one is used for detection. In this way, because the laser beam is not divided into five but is used as a single laser beam, the light intensity is sufficiently high. In the case where the scanning laser microscope 1 is used for observation, the light intensity can be adjusted by reducing the amplitude of the high-frequency acoustic waves.

Figure 4:
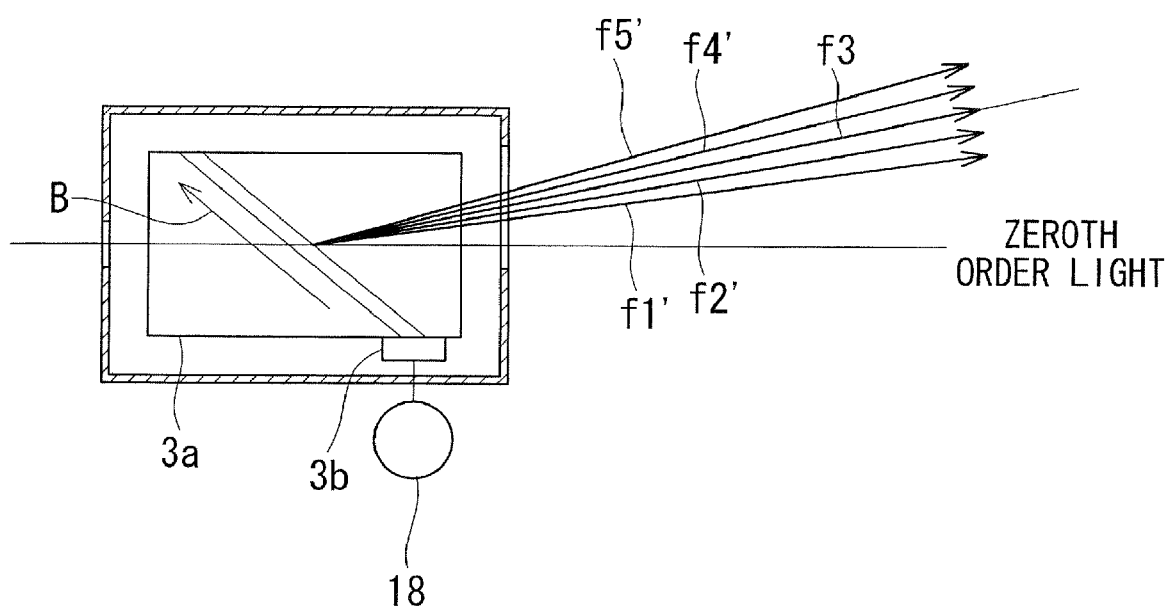
FIG. 4 shows deflections of a laser beam occurring when high-frequency acoustic waves of different frequencies are applied to the acousto-optic deflector shown in FIG. 2.

A galvanometer-zoom function for enlarging an image by reducing the swing angle of the proximity galvanometer mirror 4, without changing the sampling resolution (the number of image pixels) will be described below. For example, in the case of a galvanometer-zoom of 2× (i.e., in which the image acquisition area is reduced to one-fourth its normal size), as shown in FIG. 4, the frequencies of acoustic waves applied to the acousto-optic deflector 3 by the control unit 17 are changed to f1', f2', f3, f4', and f5', to reduce to half the angle in which the laser beam is divided, with respect to the optical axis having a deflection angle of θ3. This reduces the spacing of the five beam spots aligned on the specimen A to half, in the sub-scanning direction. Then, the swing angles of the proximity galvanometer mirror 4, both in the main scanning direction and the sub-scanning direction, are reduced to half.

FIG. 4 shows the directions in which a laser beam is deflected by the acousto-optic deflector 3 at this time. The frequency f3, which corresponds to the central optical axis, is applied unmodified. The frequencies f1', f2', f4', and f5' are set such that the differences in the deflection angles with respect to the frequency f3 are half those shown in FIG. 2.

Figure 5:
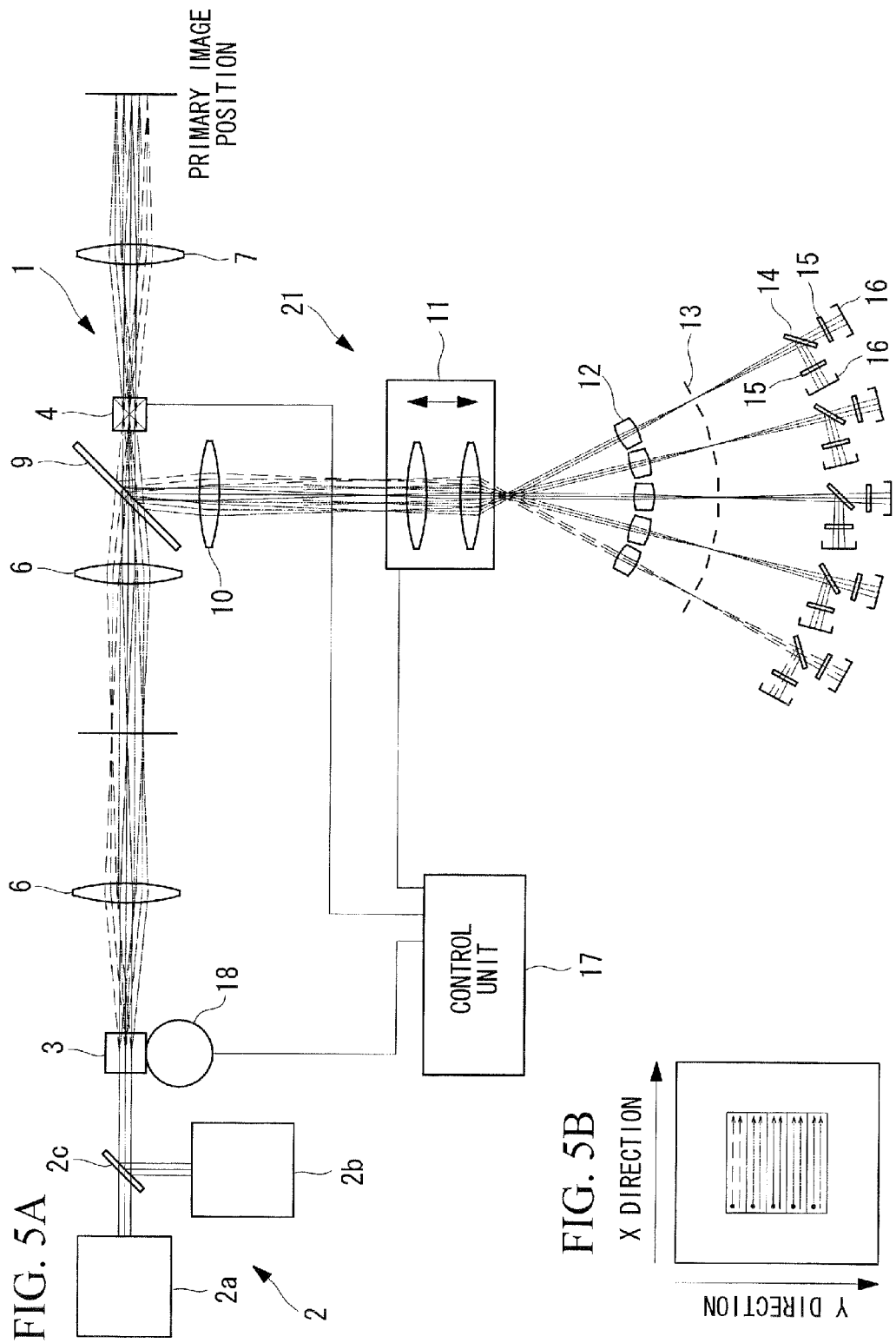
FIG. 5A is a partially omitted ray diagram showing the beam spots being scanned over a smaller area of the specimen by the scanning laser microscope shown FIG. 1.
FIG. 5B shows movement of the beam spots shown in FIG. 5A.

At this time, the magnification of the magnification-varying lens 11 arranged in the detection optical paths 21 is changed. By changing the magnification of the magnification-varying lens 11, the fluorescence rays emitted from the respective scanning spots travel along the same optical paths 21 as those before the image acquisition area is changed. Then, as shown in FIG. 5A, the fluorescence rays pass through the confocal lenses 12, the confocal pinholes 13, the light-splitting dichroic mirrors 14, and the barrier filters 15, which are arranged in the optical paths, and are simultaneously detected by the photodetectors 16. Thus, as shown in FIG. 5B, the laser beam can be scanned over a scanning area that is one-fourth the size of that shown in FIG. 3 for observation.

Figure 6:
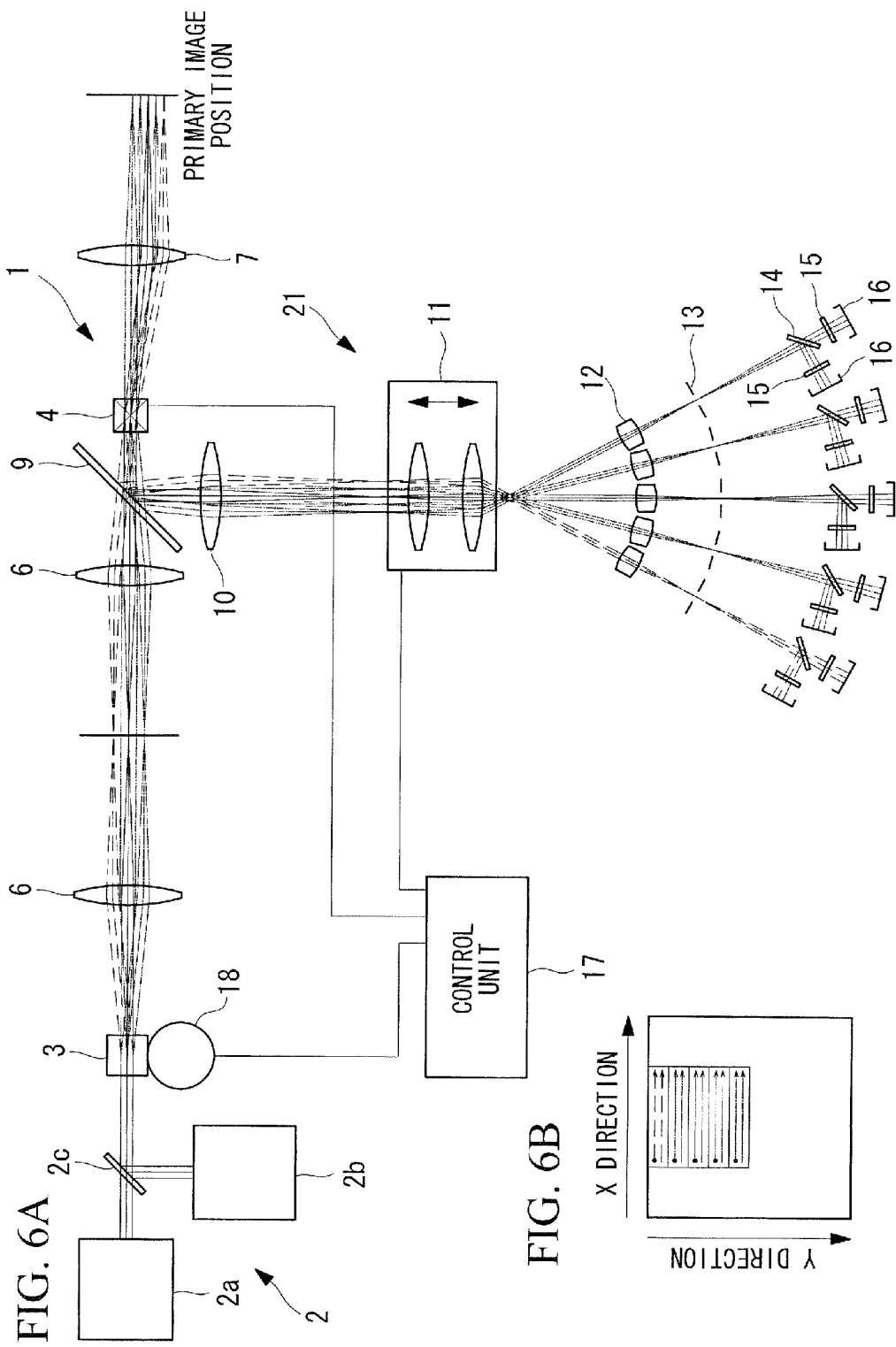
FIG. 6A is a partially omitted ray diagram showing shifting of the beam spots scanned over the small area of the specimen shown in FIG. 5A.
FIG. 6B shows movement of the beam spots shown in FIG. 6A.

To shift the halved image acquisition area upward, as shown in FIG. 6B, the scanning area in the sub-scanning direction is moved upward. The position of the magnification-varying lens 11 may be the same as above. Because descanning is performed by the proximity galvanometer mirror 4, the fluorescence from the five scanning spots travel along the five detection optical paths 21, as shown in FIG. 6A.

In FIGS. 5A and 6A, components arranged between the primary image position formed by the imaging lens 8 and the specimen A are omitted.

Although the number of scanning spots is, by way of example, one or five in the above description, the number of scanning spots may be any number between one and five. In that case, the magnification of the magnification-varying lens 11 needs to be set such that the detection light beams are aligned with some of the detection optical paths 21, according to the spacing between the scanning spots. Further, the central scanning position in the sub-scanning direction needs to be set such that it covers the entirety of the image.

In the scanning laser microscope 1 according to the present embodiment, the light intensity is divided according to the number of scanning spots that are simultaneously scanned. Thus, light is used effectively, with no loss of light occurring when the number of scanning spots is changed. Accordingly, even when a single spot is irradiated with strong light for light stimulus, for example, a large light source is not necessary. In a conventional scanning laser microscope using a microlens array, even when a single spot is irradiated with strong light, the light intensity is divided. However, because the light intensity for each spot is very small, such a scanning laser microscope cannot perform light stimulus.

Furthermore, by changing the image acquisition area by changing the swing angle of the proximity galvanometer mirror 4 without changing the sampling resolution, that is, by using the galvanometer-zoom function, the spacing between the scanning spots can be changed, allowing all of the spots to be used for observation. This makes it possible to maintain the scanning speed, while realizing an optical resolution determined by the numerical aperture of the objective lens 5. In a conventional scanning laser microscope using a microlens array and a galvanometer mirror, when zooming is performed using the galvanometer mirror, some scanning spots are positioned outside of the image acquisition area. Therefore, the effective number of scanning spots decreases, reducing the scanning speed. In addition, because the specimen is unnecessarily irradiated with light, fading of fluorescence and damage to the specimen occur excessively.

In addition, the number of scanning spots that are simultaneously scanned can be changed within the number of the photodetectors 16. Therefore, the number of scanning spots can be appropriately selected according to the resolution and the movement of the specimen A. Further, because the acousto-optic deflector 3, which divides a laser beam into a plurality of laser beams, is arranged at a position optically conjugate with the pupil 20 of the objective lens 5, all the divided laser beams pass through the center of the pupil 20 of the objective lens 5. Accordingly, the specimen A can be observed with a high resolution.

According to the present embodiment, the Ar laser light source 2a (wavelength 488 nm) and the DPSS laser light source 2b (wavelength 560 nm), which constitute the laser light source 2, may simultaneously emit laser beams. In such a case, although the laser beams having wavelengths of 488 nm and 560 nm are coaxially incident on the acousto-optic deflector 3, the frequency ranges at which each of the laser beams is deflected at deflection angles $\theta1$ to $\theta5$ can be made not to overlap. Accordingly, by applying acoustic waves with ten different frequencies to the crystal 3a, the laser beams with wavelengths of 488 nm and 560 nm can both be coaxially emitted in five directions.

The fluorescence rays excited by the laser beam with a wavelength of 488 nm are reflected by the light-splitting dichroic mirrors 14 and detected by the photodetectors 16 (1CH). The fluorescence rays excited by the laser beam with a wavelength of 560 nm pass through the light-splitting dichroic mirrors 14 and are detected by the photodetectors 16 (2CH). The position of the magnification-varying lens 11 provided in the detection optical paths 21, corresponding to the image acquisition area, may be the same as above.

This configuration provides the same effect as described above, even if a multi-stained specimen is used.

A scanning laser microscope 30 according to a second embodiment of the present invention will be described below with reference to FIGS. 7 to 11.

In the description of the present embodiment, like reference numerals refer to corresponding parts of the scanning laser microscope 1 according to the first embodiment as described above, and an explanation thereof will be omitted.

Referring to FIG. 7 the scanning laser microscope 30 according to the present embodiment includes a digital mirror device (micro-element array) 31 (hereinafter, "DMD 31") that is arranged in the detection optical paths 21 and consists of a micro-mirror array that includes a plurality of micro-mirrors arranged in a matrix, and a line sensor (one-dimensional photodetector) 32. The converging lens 10 arranged in the detection optical paths 21, which are reflected by the excitation dichroic mirror 9, forms images of the fluorescence rays emitted from the plurality of scanning spots on the specimen A onto the DMD 31. A relay lens 33 establishes an imaging relationship between the DMD 31 and the line sensor 32.

Figure 8:
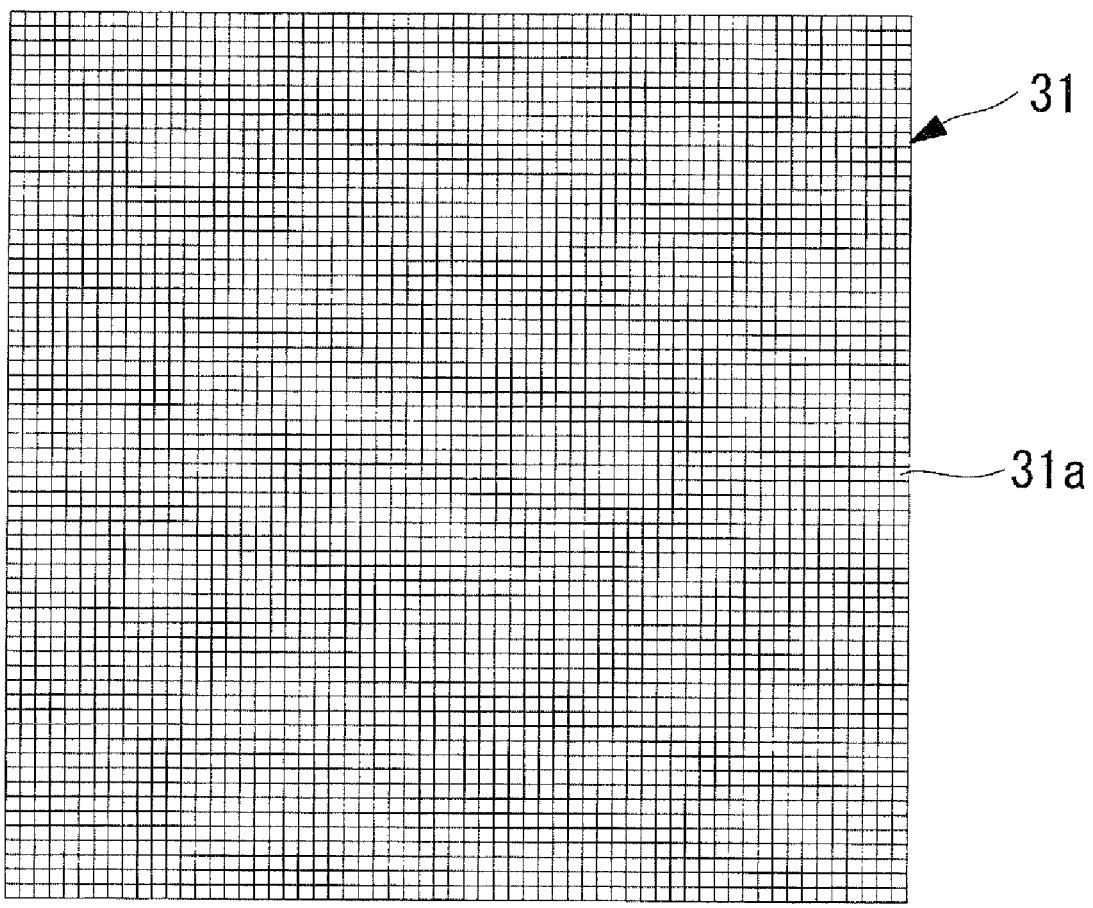
FIG. 8 is a front view of a reflection surface of a digital mirror device (DMD) provided in the scanning laser microscope shown in FIG. 7.

Referring to FIG. 8, the DMD 31 has a plurality of micro-mirrors (micro-elements) 31a arranged in a matrix. Each micro-mirror 31a can be switched between ON and OFF. When a micro-mirror 31a is ON, a light beam travels along the optical axis. When a micro-mirror 31a is OFF, a light beam is largely diverted from the optical axis and is directed to a trapping mechanism (not shown). In FIG. 8, for convenience's sake, the state in which a light beam travels straight along a transmission optical path, not a reflection optical path, is defined as the ON state of the micro-mirrors 31a.

The DMD 31 serves to select light beams guided to the optical path and serves as confocal pinholes by turning on a micro-mirror 31a or a group of micro-mirrors 31a.

The direction in which the pixel row of the line sensor 32 extends and the direction in which the acousto-optic deflector 3 divides the laser beam are the sub-scanning direction of the proximity galvanometer mirror 4 (Y direction).

Although, in FIG. 7, the acousto-optic deflector 3 divides a laser beam into three beams, it may divide a laser beam into any number of beams, according to the required image acquisition time, resolution, light intensity, and image acquisition area.

The micro-mirrors 31a on the DMD 31, which serve as confocal pinholes, and the pixels on the line sensor 32 are continuously arranged in the direction in which the laser beam is divided (Y direction, that is, sub-scanning direction). Therefore, it is possible to cope with a change in the number of divisions or the traveling directions of the laser beams according to the frequencies of the acoustic waves applied to the acousto-optic deflector 3 by selecting the micro-mirror 31a on the DMD 31 and the pixels on the line sensor 32 located at positions conjugate with the plurality of scanning spots (beam spots) formed on the specimen A.

Because the proximity galvanometer mirror 4 descans the fluorescence while it scans the laser beams, the light imaged on the DMD 31 and the line sensor 32 does not move. Thus, it is not necessary to switch the micro-mirrors 31a on the DMD 31 and the effective pixels on the line sensor 32 with scanning.

Figure 9:
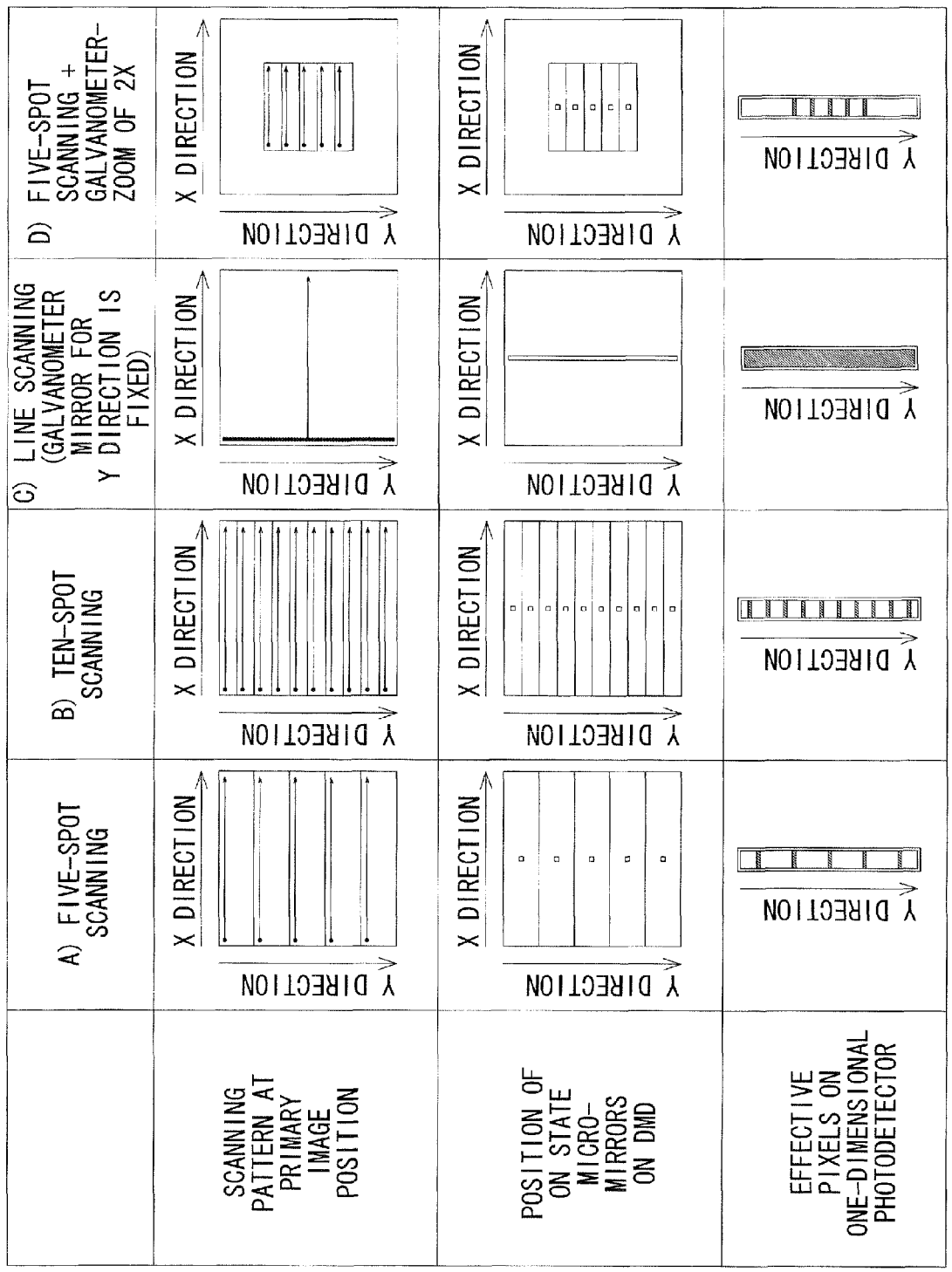
FIG. 9 is a table showing the scanning pattern of beam spots by the laser scanning microscope shown in FIG. 7, the position of ON state micro-mirrors of the DMD, and the position of effective pixels on the line sensor, for various scanning methods.

FIG. 9 is a table showing the scanning pattern of beam spots at a primary image position, the position of ON state micro-mirrors 31a on the DMD 31, and the position of pixels which are used for detection (effective pixels) on the line sensor 32, for various scanning methods, which are: A) five-spot scanning; B) ten-spot scanning; C) line scanning; and D) five-spot scanning with a galvanometer-zoom of 2×, in which the swing angle of the proximity galvanometer mirror 4 is reduced to half to make the size of the image acquisition area one-fourth the normal size.

In the case of B) ten-spot scanning, compared to the five-spot scanning, the light intensity at each spot is reduced. However, because the scanning area in the sub-scanning direction is halved, the image acquisition time is also halved.

As shown in C), by applying multiple acoustic waves having frequencies to the acousto-optic deflector 3 such that the adjoining beam spots on the specimen A overlap each other, a linear laser beam can be scanned over the specimen A.

In this case, a row of the micro-mirrors 31a that exist in the division direction (sub-scanning direction) and all the pixels on the line sensor 32 are used for detection. The proximity galvanometer mirror 4 is fixed in the sub-scanning direction (Y direction) and scans only in the main scanning direction (X direction). That is, it is possible to obtain an image by scanning in the X direction once, without scanning in the Y direction. Accordingly, the image acquisition time is drastically reduced.

However, in this case, the light intensity at each spot is very small. Further, there is no confocal effect in the Y direction, and the pixel resolution (the number of pixels) in the Y direction is limited by the number of pixels on the line sensor 32. Accordingly, this is applicable only when there is sufficient light intensity and when there is no problem with the number of pixels.

In the case of D) five-spot scanning and the image acquisition area being reduced to one-fourth without changing the sampling resolution, the frequencies of acoustic waves applied to the acousto-optic deflector 3 are changed to reduce the spacing between the five scanning spots to half. In this case, the spacing between the positions of the ON-state micro-mirrors 31a on the DMD 31 and the spacing between the positions of the pixels on the line sensor 32, which are used for detection, are also reduced to half in accordance with the change in the spacing between the scanning spots.

Examples of the line sensor 32 include a photodiode array, a multi-channel photomultiplier, and a one-dimensional image-pickup element. Instead of the DMD 31, a liquid crystal device may be used. Because the liquid crystal device has regions that are switchable between a transmission state and a light blocking state arranged in an array, and is a transmissive device, it is easier to provide the liquid crystal device than the DMD 31, which is a reflective device.

In addition to the advantage provided by the scanning laser microscope 1 according to the first embodiment, the scanning laser microscope 30 according to the present embodiment has an advantage in that, by selecting the position of micro-mirrors 31a on the DMD 31 used as the confocal pinholes and by selecting effective pixels on the line sensor 32 used for detection, the number and position of detection spots on the detection side can be flexibly changed in accordance with a change in the number and position of the scanning spots on the specimen A. Thus, not only can the number and spacing of the scanning spots be freely set taking into consideration the image acquisition time, resolution, and image acquisition area, but also line scanning is possible.

The number of divisions ranges up to the number of pixels on the line sensor 32. The pixel resolution in the line direction, during line scanning, is limited by the number of pixels on the line sensor 32.

Furthermore, the magnification-varying lens 11, which is necessary in the scanning laser microscope 1 according to the first embodiment, is not necessary. Thus, the scanning laser microscope 30 has a simple optical system, improved performance, and a low cost.

Figure 10:
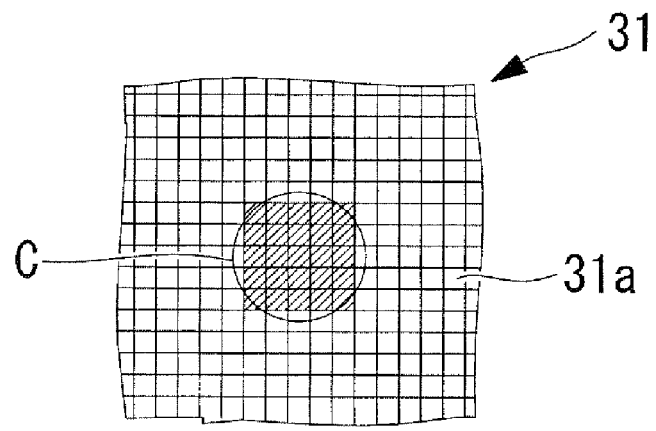
FIG. 10 shows the DMD shown in FIG. 8, in which a plurality of micro-mirrors are activated for one beam spot.

If one micro-mirror 31a on the DMD 31 is selected for one scanning spot, in the case where the diameter of the beam spot formed on the DMD 31 is larger than each micro-mirror 31a on the DMD 31, loss of light is significant. In such a case, as shown in FIG. 10, a plurality (in FIG. 10, 5×5=25) of micro-mirrors 31a that exist within the spot diameter C may be used as a group of micro-mirrors 31a for one scanning spot. In the case of line scanning, five rows of micro-mirrors 31a may be selected.

Figure 11:
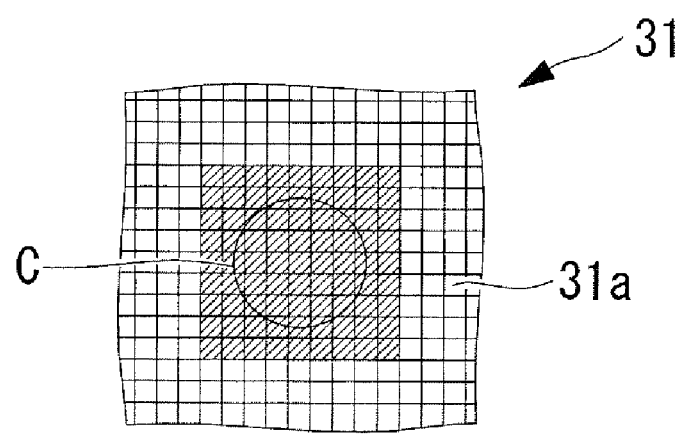
FIG. 11 shows the DMD shown in FIG. 8, in which, for one beam spot, a plurality of micro-mirrors within an area larger than the size of the beam spot are activated.
Figure 12:
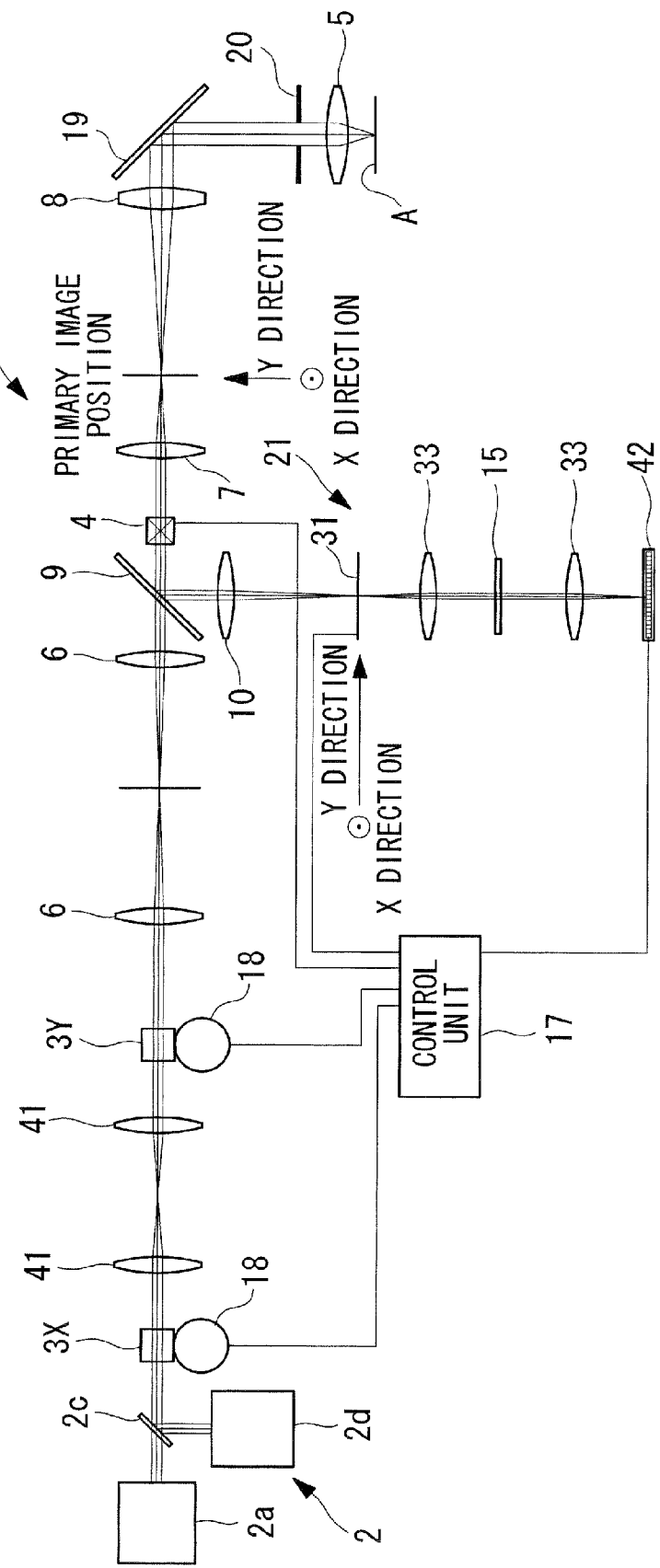
FIG. 12 shows the overall configuration of a scanning laser microscope according to a third embodiment of the present invention.

When seeking a brighter fluorescence image even by sacrificing the confocal effect, the micro-mirrors 31a may be selected such that they occupy a larger area than the spot diameter C on the DMD 31, as shown in FIG. 11. In FIG. 11, eighty-one (9×9=81) micro-mirrors 31a are in the ON state and are capable of detecting the light occupying an area a little larger than 1.5 times the spot diameter C.

In contrast, to obtain a higher confocal effect by sacrificing the brightness, the micro-mirrors 31a may be selected such that they occupy a smaller area. If, for example, four (2×2=4) micro-mirrors 31a are selected, the area occupied by them is half the spot diameter C or less, increasing the confocal effect.

Thus, by changing the size of the group of micro-mirrors 31a in accordance with the size of the spot diameter C formed on the DMD 31, it is possible to balance the confocal effect with the brightness of the fluorescence image.

It is easy to balance the confocal effect with the brightness of the fluorescence image. Accordingly, it is easy to select the signal-to-noise ratio priority setting for a dark specimen A, and the resolution (confocal effect) priority setting for a bright specimen A.

In FIG. 7, a two-dimensional photodetector, such as a charge-coupled device (CCD)) (not shown), may be arranged at the position of the DMD 31, and the relay lenses 33 may be eliminated. In such a case, the barrier filter 15 is arranged before the CCD.

In such a case, the pixels located at certain positions having an imaging relationship with the scanning spots on the specimen A may be used as the confocal pinholes and the photodetectors.

Similarly to the case described above, by using the total output from the plurality of pixels corresponding to the spot diameter C as the detection output of a single scanning spot, the CCD can function as the confocal pinholes and the photodetectors.

As a result, the DMD 31, which serves as the confocal pinholes, and the relay lenses 33 become unnecessary. Accordingly, the low-cost, compact scanning laser microscope 30 can be provided.

A scanning laser microscope 40 according to a third embodiment of the present invention will be described below with reference to FIGS. 12 to 15.

In the description of the present embodiment, like reference numerals refer to corresponding parts of the scanning laser microscope 30 according to the second embodiment, and an explanation thereof will be omitted.

The scanning laser microscope 40 according to the present embodiment is different from the scanning laser microscope 30 according to the second embodiment in that two acousto-optic deflectors 3, namely, acousto-optic deflectors 3X and 3Y, are provided so that a laser beam can be divided not only in the sub-scanning direction (Y direction), but also in the main scanning direction (X direction). The acousto-optic deflectors 3X and 3Y are optically conjugated with each other by second projection lenses 41. The scanning laser microscope 40 is also different from the scanning laser microscope 30 in that a CCD 42 is provided as a two-dimensional photodetector instead of the line sensor 32.

When acoustic waves having a plurality of frequencies are applied to the acousto-optic deflector (second acousto-optic deflector) 3X for the X direction, a laser beam is divided into a plurality of first-order beams in the X direction. When acoustic waves having a plurality of frequencies are applied to the acousto-optic deflector (first acousto-optic deflector) 3Y for the Y direction, each of the laser beams divided in the X direction is divided into a plurality of beams in the Y direction. Thus, a plurality of beam spots are arranged in a matrix on the specimen A.

The number and spacing of the beam spots, both in the X and Y directions, depend on the frequencies and number of the frequencies of the acoustic waves applied to the acousto-optic deflectors 3X and 3Y. These beam spots, as a set, are made to simultaneously illuminate a plurality of positions of the specimen A, via the proximity galvanometer mirror 4 and the objective lens 5.

These simultaneously formed scanning spots are scanned both in the sub-scanning and main scanning directions by the proximity galvanometer mirror 4. The fluorescence emitted from the specimen A passes through the micro-mirrors 31a on the DMD 31 and is detected by the pixels of the CCD 42, which has an imaging relationship with the scanning spots. Because the detection light beams are descanned by the proximity galvanometer mirror 4, the beam spots on the DMD 31 and the CCD 42 do not move.

The laser light source includes an argon (Ar) laser light source 2a (488 nm) and a semiconductor laser light source 2d (405 nm).

Wavelengths of 405 nm and 488 nm are such that the frequency ranges of the acoustic waves applied to the acousto-optic deflectors 3X and 3Y do not overlap. Therefore, using these wavelengths, desired positions in a two-dimensional plane may be simultaneously illuminated with the beam spots arranged in a matrix.

Figure 13A:
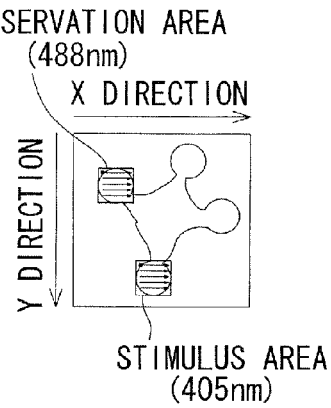
FIG. 13A is a table showing the scanning pattern of beam spots by the scanning laser microscope shown in FIG. 12, the position of ON state micro-mirrors of the DMD, and the position of effective pixels of the CCD, for various scanning methods.
Figure 14:
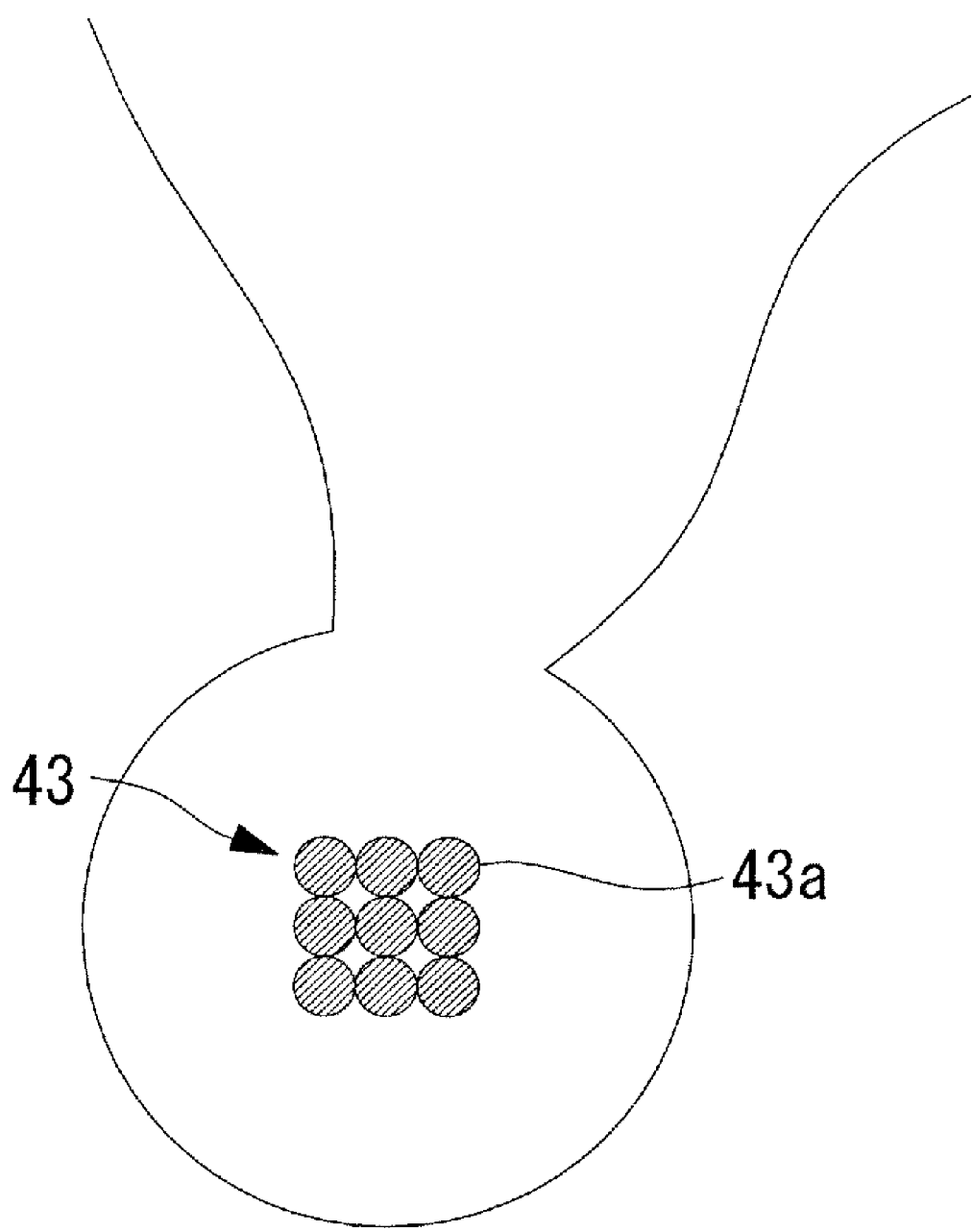
FIG. 14 is an enlarged view of stimulus beam spots used to perform macro stimulus in the scanning methods B) to D) shown in FIG. 13A and FIG. 13B.

In FIG. 13A and FIG. 13B, a table shows the settings of the detection optical paths 21 (the position of the micro-mirror(s) 31a on the DMD 31 in the ON state, and the pixel(s) of the CCD 42 used for detection (effective pixel)), for various observation methods using the scanning laser microscope 40 according to the present embodiment.

The various observation methods shown in FIG. 13A and FIG. 13B include: A) one area observation (488 nm)+one area stimulus (405 nm); B) one spot observation (488 nm)+one spot macro stimulus (405 nm); C) one area observation (488 nm)+one spot macro stimulus (405 nm); and D) one spot macro observation (488 nm)+one spot macro stimulus (405 nm)+one spot micro stimulus (405 nm).

In A), an acoustic wave having a frequency for diffracting a laser beam with a wavelength of 405 nm and an acoustic wave having a frequency for diffracting a laser beam with a wavelength of 488 nm are applied to both the acousto-optic deflectors 3X and 3Y to form two scanning spots, one for observation and the other for stimulus. The micro-mirror 31a on the DMD 31 to be turned on and the pixel of the CCD 42 to be used for detection are selected such that they are located at the positions having an imaging relationship with the scanning spot for observation. Because one proximity galvanometer mirror 4 is used, the scan sizes of the stimulus area and the observation area must be the same. However, by making the deflection angles of the laser beam with a wavelength of 405 nm for stimulus and the laser beam with a wavelength of 488 nm for observation different, it becomes possible to scan different areas with two scanning spots, as shown in the drawings.

In B), an acoustic wave having a frequency for diffracting a laser beam with a wavelength of 488 nm is applied to both the acousto-optic deflectors 3X and 3Y to form a single observation beam spot (488 nm) at a desired position on the specimen A. Three types of acoustic waves having frequencies for diffracting a laser beam with a wavelength of 405 nm are applied to both the acousto-optic deflectors 3X and 3Y to form nine (3×3=9) adjacent beam spots 43a for stimulus at a desired position on the specimen A. Because a stimulus macro beam spot 43 consists of nine beam spots 43a, it is possible to simultaneously apply light stimulus to a large area of the specimen A (see FIG. 14). With one spot observation and one spot stimulus, the proximity galvanometer mirror 4 does not perform scanning and is in an unoperated state.

The micro-mirror 31a on the DMD 31 to be turned on and the pixel of the CCD 42 to be used for detection are selected such that they are located at the positions (regions) having an imaging relationship with the scanning spot for observation. Although the wavelengths for stimulus and observation need to be different, it is possible to perform one spot observation while performing one spot macro stimulus. The size of the macro beam spot 43 for macro stimulus can be adjusted by changing the frequencies of the acoustic waves applied to the acousto-optic deflectors 3X and 3Y. Accordingly, it is possible to form the macro beam spot 43 for macro stimulus in accordance with the area of the specimen A to be stimulated.

In C), using the same frequencies as B), a single observation beam spot (488 nm) and a stimulus macro beam spot (405 nm, consisting of nine beam spots) 43 are formed. The proximity galvanometer mirror 4 is scanned in the main scanning direction and the sub-scanning direction for area observation. At this time, to prevent the stimulus macro beam spot 43 from moving, the frequencies of the acoustic waves applied to the acousto-optic deflectors 3X and 3Y to form the stimulus macro beam spot 43 are scanned in the direction opposite to the scanning direction of the galvanometer mirror 4. Although the wavelengths for stimulus and observation need to be different, it is possible to perform one area observation while performing one spot macro stimulus.

In the above-described observation methods A), B), and C), it is possible to switch the positions of stimulus and observation. By changing the frequencies of the acoustic waves applied to the acousto-optic deflectors 3X and 3Y, the positions can be switched rapidly.

In D), an observation macro beam spot (488 nm) and a stimulus macro beam spot (405 nm) having the same shape as the observation macro beam spot are formed, both consisting of nine (3×3=9) adjacent beam spots. While one spot macro stimulus is performed, one spot macro observation is performed. The micro-mirrors 31a on the DMD 31 to be turned on and the effective pixels of the CCD 42 to be used for detection are selected such that they occupy an area corresponding to the size of the observation macro beam spot. Because the area of the macro observation can be adjusted by changing the number of the frequencies of the acoustic waves applied to the acousto-optic deflectors 3X and 3Y, it is possible to perform one spot observation from a small area to a large area. The proximity galvanometer mirror 4 is in an unoperated state.

From this state, the macro stimulus with the laser beam having a wavelength of 405 nm is rapidly switched to one spot micro stimulus at a different position. At this time, for the stimulus light (405 nm), the number of frequencies of acoustic waves applied to the acousto-optic deflectors 3X and 3Y is reduced from three to one, and the frequency is changed to one corresponding to the position of the specimen A to be subjected to the micro stimulus. Because the switching depends on the switching speed of the acousto-optic deflectors 3X and 3Y, the switching is performed more rapidly than the switching by the proximity galvanometer mirror 4.

The scanning laser microscope 40 according to the present embodiment can easily form macro spots of desired sizes, using two acousto-optic deflectors, namely, 3X and 3Y. Therefore, it has an advantage in that the sizes of the stimulus and observation beam spots can be flexibly set in accordance with the area to be stimulated or the area to be observed.

In addition, it is possible to apply macro stimulus and micro stimulus to different positions, while alternately and rapidly switching them.

When laser beams having different wavelengths are used, scanning spots that simultaneously illuminate the specimen A can be formed in two dimensions, at different positions, corresponding to the respective wavelengths. This makes it possible to narrow down areas of interest sparsely distributed over the field of view of the specimen A and simultaneously observe and stimulate them.

Although the wavelengths for stimulus and observation need to be different, by scanning the frequencies of the acoustic waves applied to the acousto-optic deflectors 3X and 3Y in the direction opposite to the scanning direction of the proximity galvanometer mirror 4, it is possible to keep applying stimulus to a fixed spot while observing an area.

Figure 15:
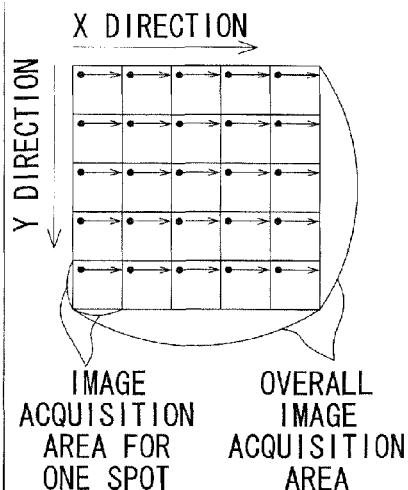
FIG. 15 is a table, similar to FIG. 13A and FIG. 13B, showing the scanning pattern of beam spots by the scanning laser microscope, the position of ON state micro-mirrors of the DMD, and the position of effective pixels of the CCD, for various scanning methods.

As shown in A) of FIG. 15, it is possible to form 25 equally spaced scanning spots by applying acoustic waves having five frequencies to each of the acousto-optic deflectors 3X and 3Y. In this case, the image acquisition area is divided into 25 sections to be simultaneously scanned with the 25 scanning spots by the proximity galvanometer mirror 4. The fluorescence emitted from the 25 sections passes through the DMD 31 functioning as confocal pinholes and is simultaneously detected by the CCD 42 functioning as a two-dimensional photodetector. FIG. 15 also shows the micro-mirrors 31a and the detection pixels to be selected.

Because the 25 scanning spots are descanned by the proximity galvanometer mirror 4, the imaging positions on the micro-mirrors 31a of the DMD 31 and on the CCD 42 do riot move.

As shown in B) of FIG. 15, a galvanometer-zoom of 2× may be used by reducing the swing angle of the proximity galvanometer mirror 4 to half.

In this case, not only the number of lines in the Y direction, but also the number of detection scanning spots in the X direction is reduced to one-fifth, whereby higher speed image acquisition can be achieved. In addition, there is no loss of light because all the created beam spots can be used even when zooming by the proximity galvanometer mirror 4 is performed.

Figure 16:
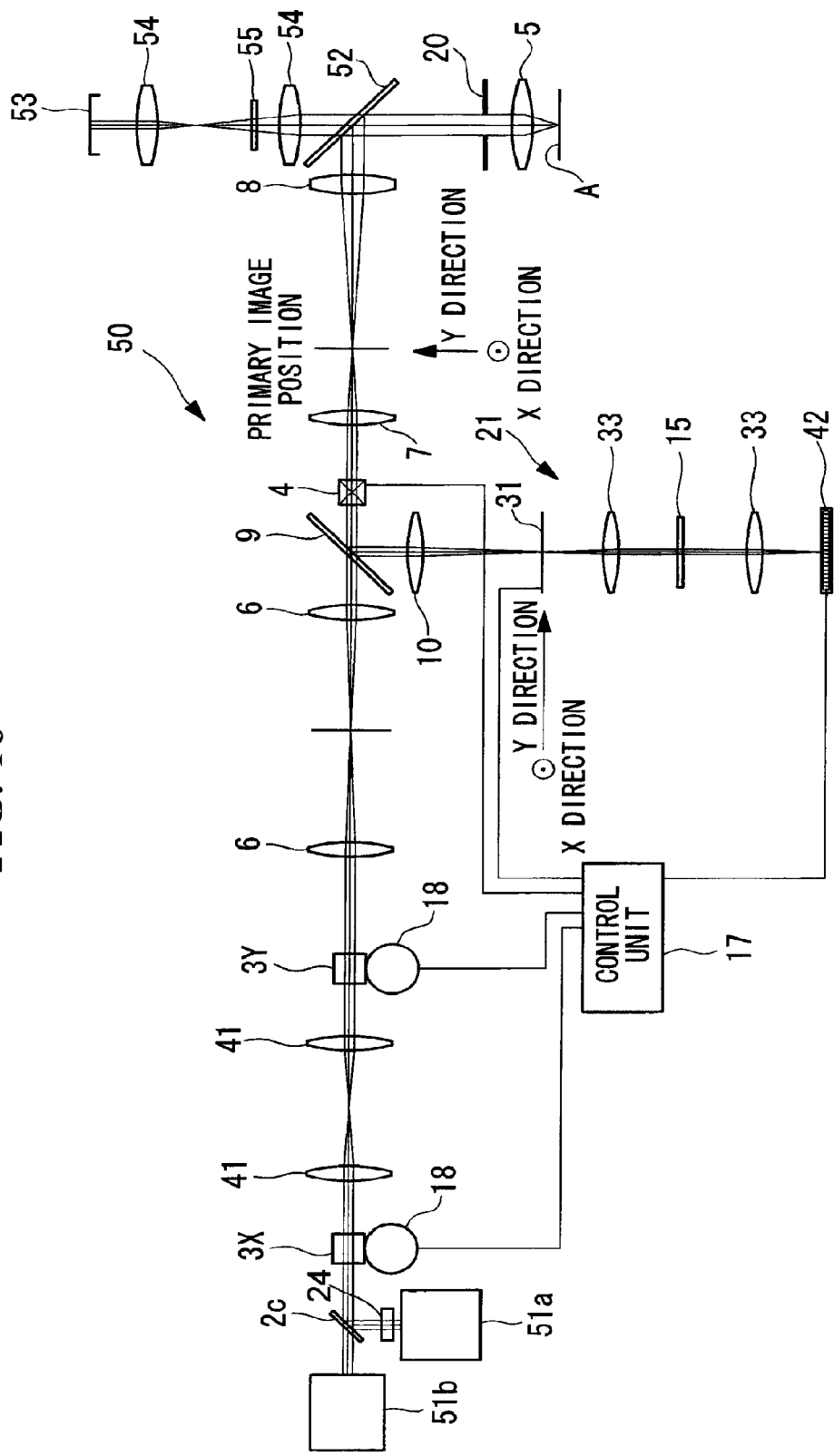
FIG. 16 shows the overall configuration of a scanning laser microscope according to a fourth embodiment of the present invention.

A scanning laser microscope 50 according to a fourth embodiment of the present invention will be described below with reference to FIG. 16.

In the description of the present embodiment, like reference numerals refer to corresponding parts of the scanning laser microscope 40 according to the third embodiment, and an explanation thereof will be omitted.

The scanning laser microscope 50 according to the present embodiment includes an IR pulse laser light source (near-infrared pulse laser light source) 51a that emits a laser beam with a wavelength of 720 nm and an IR pulse laser light source (near-infrared pulse laser light source) 51b that emits a laser beam with a wavelength of 950 nm. The pulse laser beam with a wavelength of 720 nm applies light stimulus by two-photon excitation (e.g., caged) to the specimen A. The pulse laser beam with a wavelength of 950 nm causes the specimen A to emit fluorescence by two-photon excitation (gamma-fetoprotein (GFP) and yellow fluorescent protein (YFP), which are fluorescent proteins).

In two-photon excitation, fluorescence is generated only at a light focal point, where the photon density is high. Therefore, sufficient resolution in the Z direction can be ensured without confocal pinholes. Thus, instead of the fluorescence being returned to the proximity galvanometer mirror 4, the fluorescence is guided by a dichroic mirror 52, which reflects the IR pulse laser beam while allowing the fluorescence to pass therethrough, arranged between the objective lens 5 and the imaging lens 8 to an optical path where a photodetector 53 is arranged (this is called "non-descan detection" for effectively collecting scattered fluorescence). In this configuration, a relay lens 54 for the photodetector 53 makes the photodetector 53 and the pupil 20 of the objective lens 5 conjugate with each other. In the drawings, reference numeral 55 denotes a barrier filter.

The dichroic mirror 52 may be switched with a total reflection mirror (not shown). By switching the dichroic mirror 52 with the total reflection mirror, the optical path leading to the photodetector 53 may be switched with the detection optical paths 21, in which the DMD 31 and the CCD 42 for detection are arranged.

If the frequency ranges of the acoustic waves applied to the acousto-optic deflectors 3X and 3Y do not overlap between the laser beams with wavelengths of 720 nm and 950 nm, the scanning laser microscope 50 according to the present embodiment can also perform the observation and the stimulus shown in A) and B) of FIG. 13A and FIG. 13B, and can perform non-descan detection suitable for multiphoton detection.

Thus, the scanning laser microscope 50 according to the present embodiment has the same advantage as that according to the third embodiment in performing stimulus and observation by multiphoton excitation, and makes it possible to perform bright observation by means of non-descan detection.

In the present embodiment, a beam expander 24 (see FIG. 16; beam-diameter-varying optical system) for optically enlarging the spot diameter on the specimen A by reducing the beam diameter may be provided in the optical path of the laser beam with a wavelength of 720 nm before the optical paths of the laser beams with wavelengths of 720 nm and 950 nm are combined.

This optically increases the spot diameter at the time of macro stimulus and reduces the number of frequencies of the acoustic waves applied to the acousto-optic deflectors 3X and 3Y to increase the area where the spot diameters overlap each other. When the beam spots are overlapped by the acousto-optic deflectors 3X and 3Y, the spot diameter increases only in the X and Y directions. However, when the spot diameter is optically increased by the beam expander, the light intensity of the stimulus light is distributed also in the Z direction. Accordingly, it is possible to form large spots in the X, Y, and Z directions.

What is claimed is:

1. A scanning laser microscope comprising:
    a laser light source;
    an acousto-optic deflector arranged in an optical path of a laser beam emitted from the laser light source, wherein the acousto-optic deflector is capable of changing a traveling direction of the laser beam by changing frequencies of acoustic waves applied to a crystal;
    a frequency control unit configured to simultaneously apply acoustic waves having a plurality of frequencies to the crystal of the acousto-optic deflector to split an incident laser beam into a plurality of laser beams;
    an objective lens configured to converge the laser beams traveling from the acousto-optic deflector to form a plurality of beam spots on a specimen; and
    an optical scanning device configured to two-dimensionally scan a plurality of scanning spots consisting of the beam spots on the specimen by deflecting the laser beams from the acousto-optic deflector in two directions perpendicular to each other,
    wherein the acousto-optic deflector, the optical scanning device, and a pupil of the objective lens are arranged at positions optically conjugate with each other.

2. The scanning laser microscope according to claim 1, further comprising:
    a beam splitter arranged in an optical path between the acousto-optic deflector and the objective lens and configured to separate the laser beam and returning light from the specimen; and
    a photodetector configured to detect the returning light from the specimen after being separated by the beam splitter.

3. The scanning laser microscope according to claim 2, wherein:
    deflection directions of the plurality of laser beams deflected in different directions by the acousto-optic deflector are aligned with a sub-scanning direction from among the two perpendicular directions scanned by the optical scanning device;
    confocal pinholes through which returning light originating from the plurality of scanning spots on the specimen is made to pass are provided in an optical path of the returning light from the specimen after being separated by the beam splitter, and the photodetector includes a plurality of the photodetectors which are provided so as to individually detect the returning light emitted from each scanning spot and passed through a corresponding confocal pinhole.

4. The scanning laser microscope according to claim 3, further comprising an image processing unit configured to form a single image by combining images acquired by the photodetectors.

5. The scanning laser microscope according to claim 3, wherein the confocal pinholes are comprised by a micro-element array that includes a plurality of micro-elements arranged in a matrix and wherein micro-elements within an area having an imaging relationship with the plurality of scanning spots are switched to an ON state.

6. The scanning laser microscope according to claim 5, wherein the area of the micro-elements to be switched to the ON state to be used as the confocal pinholes is determined according to the frequencies of acoustic waves applied to the crystal of the acousto-optic deflector.

7. The scanning laser microscope according to claim 6, wherein pixels on the photodetector to be used for detection are determined according to the frequencies of acoustic waves applied to the crystal of the acousto-optic deflector.

8. The scanning laser microscope according to claim 3, further comprising a magnification-varying lens arranged between the beam splitter and the confocal pinholes,
wherein a magnification of the magnification-varying lens is variably controlled in accordance with an image acquisition area.

9. The scanning laser microscope according to claim 2, wherein the photodetector is a one-dimensional photodetector or a two-dimensional photodetector configured to detect the returning light from the scanning spots with pixels on the photodetector at positions having an imaging relationship with the plurality of scanning spots.

10. The scanning laser microscope according to claim 9, further comprising a micro-element array including a plurality of micro-elements, wherein an area of the micro-elements to be switched to an ON state to be used as confocal pinholes is determined according to the frequencies of acoustic waves applied to the crystal of the acousto-optic deflector.

11. The scanning laser microscope according to claim 10, wherein the pixels on the photodetector to be used for detection are determined according to the frequencies of acoustic waves applied to the crystal of the acousto-optic deflector.

12. The scanning laser microscope according to claim 9, wherein the pixels on the photodetector to be used for detection are determined according to the frequencies of acoustic waves applied to the crystal of the acousto-optic deflector.

13. The scanning laser microscope according to claim 9,
wherein the frequency control unit adjusts the frequencies of the plurality of acoustic waves applied to the crystal of the acousto-optic deflector such that a spacing between the scanning spots formed in a sub-scanning direction is equal to a spacing between detection pixels of the one-dimensional photodetector or a spacing between detection pixels of the two-dimensional photodetector in the sub-scanning direction, so as to illuminate the specimen with substantially linear light, and
wherein the photodetector simultaneously detects linear returning light from the plurality of scanning spots on the specimen.

14. The scanning laser microscope according to claim 2, wherein the photodetector is a two-dimensional photodetector, and wherein a plurality of confocal pinholes are formed by activating, in respective correspondence with each scanning spot, a plurality of pixels on the photodetector at positions having an imaging relationship with the plurality of scanning spots.

15. The scanning laser microscope according to claim 14, wherein the pixels on the photodetector to be used for detection are determined according to the frequencies of acoustic waves applied to the crystal of the acousto-optic deflector.

16. The scanning laser microscope according to claim 1, wherein the frequency control unit adjusts the frequencies of acoustic waves applied to the crystal of the acousto-optic deflector in accordance with a change in a scanning area of the optical scanning device.

17. The scanning laser microscope according to claim 16, further comprising a micro-element array that includes a plurality of micro-elements arranged in a matrix, wherein micro-elements within an area having an imaging relationship with the plurality of scanning spots are switched to an ON state to function as confocal pinholes.

18. The scanning laser microscope according to claim 17, wherein the area of the micro-elements to be switched to the ON state to be used as the confocal pinholes is determined according to the frequencies of acoustic waves applied to the crystal of the acousto-optic deflector.

19. The scanning laser microscope according to claim 18, wherein pixels on a photodetector to be used for detection are determined according to the frequencies of acoustic waves applied to the crystal of the acousto-optic deflector.

20. The scanning laser microscope according to claim 16, further comprising a photodetector, wherein the photodetector is a one-dimensional photodetector or a two-dimensional photodetector configured to detect returning light from the plurality of scanning spots with pixels on the photodetector at positions having an imaging relationship with the plurality of scanning spots.

21. The scanning laser microscope according to claim 20, further comprising a micro-element array including a plurality of micro-elements, wherein an area of the micro-elements to be switched to an ON state to be used as confocal pinholes is determined according to the frequencies of acoustic waves applied to the crystal of the acousto-optic deflector.

22. The scanning laser microscope according to claim 21, wherein the pixels on the photodetector to be used for detection are determined according to the frequencies of acoustic waves applied to the crystal of the acousto-optic deflector.

23. The scanning laser microscope according to claim 20, wherein the pixels on the photodetector to be used for detection are determined according to the frequencies of acoustic waves applied to the crystal of the acousto-optic deflector.

24. The scanning laser microscope according to claim 20,
wherein the frequency control unit adjusts the frequencies of the plurality of acoustic waves applied to the crystal of the acousto-optic deflector such that a spacing between the scanning spots formed in a sub-scanning direction is equal to a spacing between detection pixels of the one-dimensional photodetector or a spacing between detection pixels of the two-dimensional photodetector in the sub-scanning direction, so as to illuminate the specimen with substantially linear light, and
wherein the photodetector simultaneously detects linear returning light from the plurality of scanning spots on the specimen.

25. The scanning laser microscope according to claim 16, further comprising a photodetector, wherein the photodetector is a two-dimensional photodetector, and wherein a plurality of confocal pinholes are formed by activating, in respective correspondence with each scanning spot, a plurality of pixels on the photodetector at positions having an imaging relationship with the plurality of scanning spots.

26. The scanning laser microscope according to claim 25, wherein the pixels on the photodetector to be used for detection are determined according to the frequencies of acoustic waves applied to the crystal of the acousto-optic deflector.

27. The scanning laser microscope according to claim 1, wherein the acousto-optic deflector divides the light beam both in a main scanning direction and a sub-scanning direction of the optical scanning device.

28. The scanning laser microscope according to claim 27, wherein the acousto-optic deflector includes a first acousto-optic deflection unit configured to deflect the laser beam in the sub-scanning direction, and a second acousto-optic deflection unit configured to deflect the laser beam in the main scanning direction, wherein the first and second acousto-optic deflection units are provided so that the plurality of scanning spots are formed in a matrix on the specimen.

29. The scanning laser microscope according to claim 28,
wherein the frequency control unit applies acoustic waves having a plurality of frequencies to each of the two acousto-optic deflection units to divide the laser beam into the plurality of laser beams and form the beam spots on the specimen,
wherein a macro spot is formable by arranging beam spots in an adjacent or partially overlapping manner, and
wherein the number and/or interval of the frequencies of acoustic waves applied to the acousto-optic deflector is adjusted such that a size of the formed macro spot is changed.

30. The scanning laser microscope according to claim 29, further comprising a beam-diameter-varying optical system configured to vary a diameter of the laser beam incident on the pupil of the objective lens, wherein the beam-diameter-varying optical system is provided between the laser light source and the acousto-optic deflector.

31. The scanning laser microscope according to claim 28, further comprising:
a beam splitter which is provided in an optical path between the objective lens and the two acousto-optic deflection units, and which is configured to separate the laser beam and returning light from the specimen; and
a photodetector configured to detect the returning light from the specimen after being separated by the beam splitter.

32. The scanning laser microscope according to claim 31,
wherein the laser light source emits a stimulus laser beam and an observation laser beam having different wavelengths,
wherein the frequency control unit simultaneously applies acoustic waves having frequencies corresponding to the wavelengths of the laser beams to the acousto-optic deflector to form the scanning spots of the laser beams at different positions on the specimen, and
wherein the photodetector detects the returning light from scanning spots of the observation laser beam.

33. The scanning laser microscope according to claim 32, wherein the frequency control unit changes the frequencies of acoustic waves applied to the acousto-optic deflector so as to switch between an irradiation position of the stimulus laser beam and an irradiation position of the observation laser beam.

34. The scanning laser microscope according to claim 32, wherein the frequency control unit, independently of the scanning by the optical scanning device, scans the frequencies of acoustic waves applied to the acousto-optic deflector so that an irradiation position of the stimulus laser beam remains fixed.

35. The scanning laser microscope according to claim 31,
wherein the frequency control unit adjusts the frequencies of acoustic waves applied to the acousto-optic deflector such that a spacing between the beam spots, both in X and Y directions, arranged in the matrix on the specimen, is uniform,
wherein, with the beam spots, the optical scanning device scans scanning areas in the main scanning direction and the sub-scanning direction in accordance with the spacing between the beam spots, and
wherein confocal pinholes are arranged corresponding to imaging positions of the beam spots.

36. The scanning laser microscope according to claim 35, further comprising a display unit configured to display an image acquired by the photodetector.

37. The scanning laser microscope according to claim 1, wherein the laser light source is a near-infrared pulse laser light source for multiphoton excitation observation.

38. The scanning laser microscope according to claim 1, further comprising:
an optical system configured to relay the laser beams simultaneously deflected in different directions from each other by the acousto-optic deflector, so that each of the laser beams is incident on the pupil of the objective lens in accordance with a corresponding deflection angle.

* * * * *